(12) United States Patent
Pocock et al.

(10) Patent No.: US 6,640,925 B2
(45) Date of Patent: Nov. 4, 2003

(54) LOUDSPEAKER DIAPHRAGM AND METHOD OF MANUFACTURE THEREOF

(75) Inventors: Nicholas Pocock, Hants (GB); Simon Yorick Pettman, Locks Heath (GB)

(73) Assignee: Goodman's Loudspeakers Limited, Hampshire (GB)

( * ) Notice: Subject to any disclaimer, the term of this patent is extended or adjusted under 35 U.S.C. 154(b) by 0 days.

(21) Appl. No.: 10/059,631

(22) Filed: Jan. 28, 2002

(65) Prior Publication Data

US 2002/0153194 A1 Oct. 24, 2002

(51) Int. Cl.[7] ................................................ G10K 13/00
(52) U.S. Cl. ....................................................... 181/167
(58) Field of Search ........................ 187/167, 148–151, 187/153, 157, 169, 173, 174

(56) References Cited

U.S. PATENT DOCUMENTS

| 4,351,411 A | * | 9/1982 | Inoue ........................... 181/168 |
| 4,362,772 A | * | 12/1982 | Tsukagoshi et al. ........ 428/36.4 |
| 6,148,953 A | * | 11/2000 | Fujitani ....................... 181/169 |

FOREIGN PATENT DOCUMENTS

JP          359221100       * 12/1984

* cited by examiner

Primary Examiner—Shih-Yung Hsieh
(74) Attorney, Agent, or Firm—Hodgson Russ LLP

(57) ABSTRACT

A method of manufacturing a loudspeaker diaphragm comprising moulding it from a flowable polyolefin or other plastics material such that part of the material flows during moulding a distance equal to at least 300 times the thickness of that part of material after moulding, the moulded material having a Youngs Modulus of at least 2000 MPa.

12 Claims, 3 Drawing Sheets

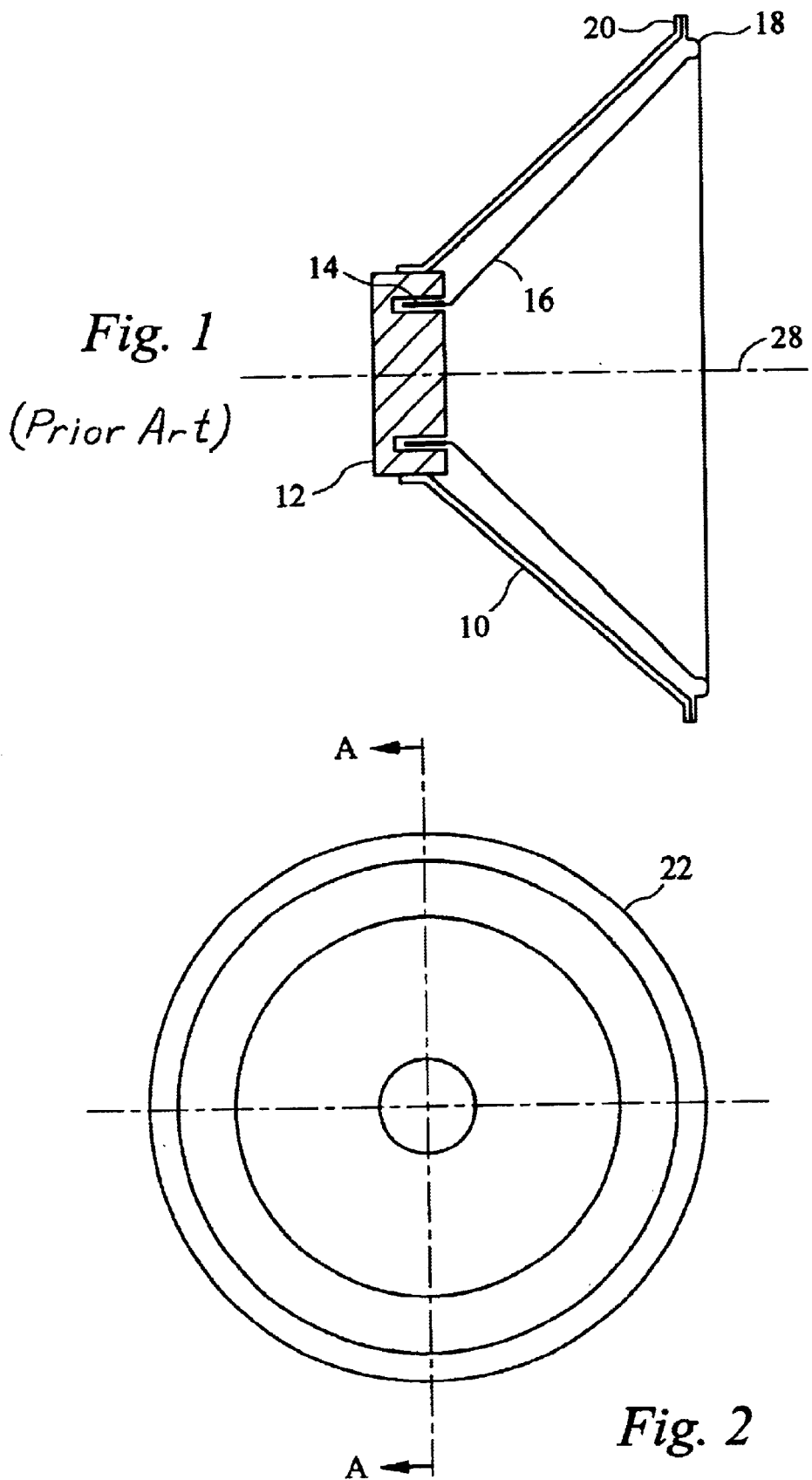

LOUDSPEAKER DIAPHRAGM AND METHOD OF MANUFACTURE THEREOF

BACKGROUND OF THE INVENTION

This invention relates to a loudspeaker diaphragm and a method of manufacture thereof. The term loudspeaker diaphragm includes the conventional round or elliptical generally cone-shaped structure, and also substantially planar membranes. The diaphragm also may have a perimeter other than circular or elliptical.

The design of a loudspeaker diaphragm, and the choice of material from which it is made, aims to provide a consistent response to an audio-frequency electric signal input to the voice coil (or other electroacoustic transducer) of the loudspeaker across its entire working frequency range.

This requirement brings into conflict the need for the cone to be light in weight, so that it can be driven efficiently by a relatively small signal, yet stiff enough to respond to the signal without unacceptable distortion or coloration of the sound. Paper cones whilst light in weight tend not to be stiff enough; cones of plastics materials tend to be relatively thick and heavy due to the limitations of the manufacturing process.

SUMMARY OF THE INVENTION

The present invention at least in its preferred embodiments seeks to provide a loudspeaker diaphragm which is less subject to the foregoing disadvantages.

The invention provides in one aspect a method of manufacturing a loudspeaker diaphragm comprising moulding it from a flowable plastics material such that part of the material flows during moulding a distance equal to at least 300 times the thickness of that part of material after moulding, the moulded material having a Youngs Modulus of at least 1500 MPa, and preferably at least 2000 MPa.

Preferably the said part of the material is injected into a mould having a moveable wall defining a mould gap, said wall being moved to reduce the gap and cause the said part of the material to flow said distance.

In another aspect the invention provides a loudspeaker diaphragm moulded from flowable plastics material having a Youngs Modulus of at least 1500 MPa (preferably at least 2000 MPa), a part of the cone having a flow length/thickness ratio (as herein defined) of at least 300.

The plastics material may be for example polypropylene or another polyolefin, or a polystyrene.

Preferably the flow length/thickness ratio exceeds 350, 400 or 500 or 600.

Preferably the thickness of the said part of the material does not exceed 0.20 mm. The material may contain reinforcing fibres, which may comprise one or more of carbon fibres, glass fibres, polyester fibres, vegetable fibres (eg. hemp or linen) or animal fibres eg. horse hair.

Preferably the Young's modulus exceeds 2000, 2500 or 3000 MPa when the material is not fibre-reinforce or 5000 or 6000 MPa if it contains reinforcing fibres.

When the fibres are carbon fibres they may constitute from 25% to 50% by weight of the material.

The longitudinal extent of the fibres may exhibit a preferred orientation radially from a central region of the diaphragm.

This orientation can be produced when the flow length is generally radially of the diaphragm.

Different regions of the diaphragm may have different thicknesses, whereby to modify the acoustic properties of the diaphragm.

At least one said region may comprise an elongate rib; for example the rib may extend around a polar axis of the diaphragm.

Alternatively or in addition a said rib may extend radially of the diaphragm.

In another aspect the invention provides an injection moulded loudspeaker diaphragm having at least one elongate rib integrally moulded thereon.

In a further aspect the invention provides a loudspeaker diaphragm having a continuous elongate rib, or a generally arcuate rib extending around a polar axis of the diaphragm. The rib may be axisymmetric, if the diaphragm is of circular section eg. conical.

The invention also includes a loudspeaker having a diaphragm as set forth above, or made by a method as set forth above.

The invention will now be described merely by way of example with reference to the accompanying drawings, wherein:

FIG. 1 shows a typical conventional loudspeaker, in cross-section;

FIG. 2 is an axial polar view of the rear face of a conical diaphragm according to the invention;

Figure 3:
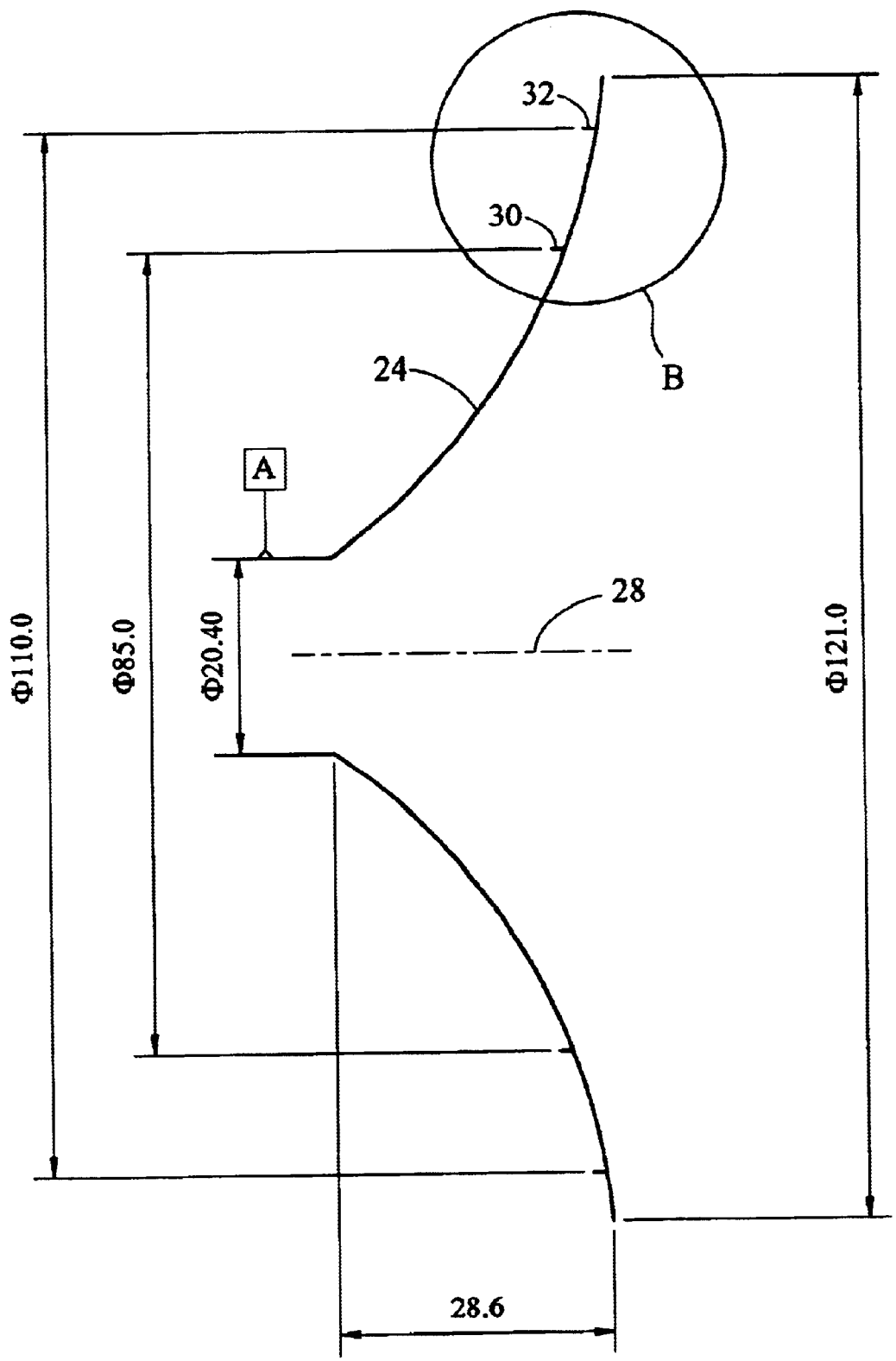
FIG. 3 is a section on line A—A of FIG. 2.

In FIG. 1 a typical loudspeaker comprises a frame or chassis 10 supporting a permanent magnetic circuit 12 having a gap wherein a voice coil 14 of a cone 16 is received. The basal edge of the cone terminates in a surround 18 the outer edge of which is fixed to a mounting ring 20 of the frame.

The cone 16, here circular in shape, is typically of paper or plastics material and needs to be as stiff and as light as possible so as to respond faithfully to an electroacoustic driving signal applied to the voice coil.

Figure 5:
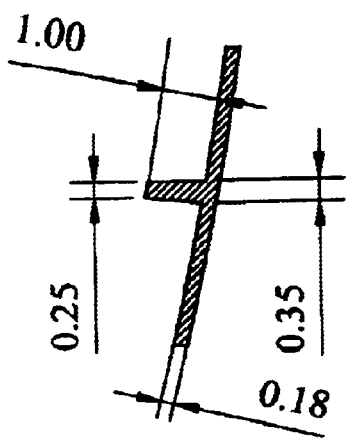
FIG. 5 is a further enlarged view of detail C of FIG. 4.
Figure 4:
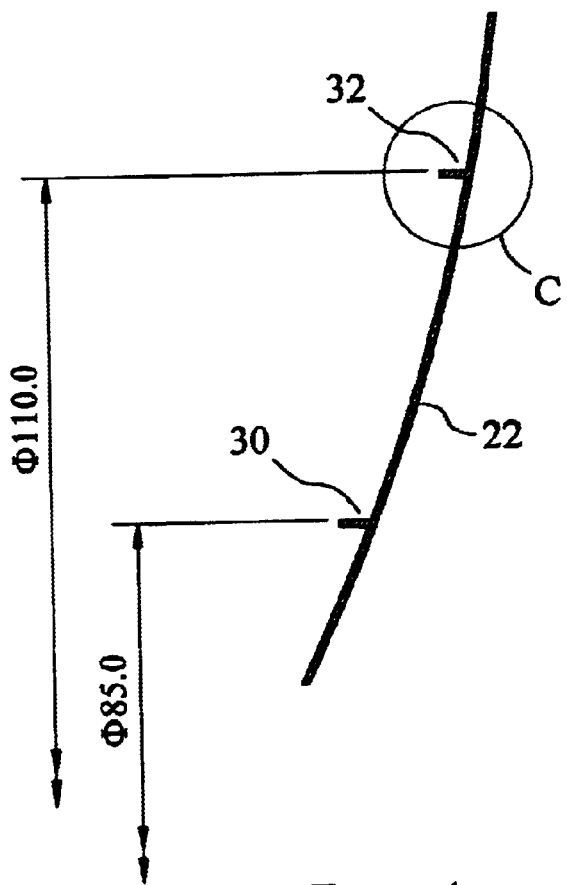
FIG. 4 is an enlarged view of detail B of FIG. 3.

A conical diaphragm 22 of the invention is shown in FIG. 2. It consists of an injection moulding of a polyolefin material such as ADSTIFF (TM) polypropylene or a syndiotactic polystyrene (if high-temperature resistance is required eg. for an automotive application) having a Youngs Modulus in its moulded state of not less than 1500 MPa and preferably at least 2000 MPa. The cone is 121 mm a diameter and the wall of the cone has (in section) an arcuate profile 24 of radius 70 mm. Centred on the polar a 28 of the cone on the rear surface thereof are two continuous (endless) arcuate solid moulded ribs 30 and 32 of diameter 85 and 110 mm respectively. The ribs art shown enlarged in FIGS. 4 and 5; from the latter it can be seen that they are 1 mm high and taper from 0.35 mm thick at the base of 0.25 mm at the tip.

The ribs are moulded integrally with the cone and project from the conical surface of the cone so as to lie parallel to the polar axis of the cone, This and the tapered shape facilitates separation of the injection moulding die as discussed hereafter. Alternatively the ribs may be moulded first, and the cone is then over-moulded on to them in a two-stage process.

The cone 22 is 0.18 mm thick, and is formed by an "inject and squash" technique. The moulding material, introduced at a gate or gates on or near the polar axis of the cone is compressed by moving displaceable parts together. That part of the material at the periphery of the cone thus is constrained to flow along a path define the curved profile of the cone, a distance of about 10 cm, which is some 550 times its final thickness. Thus this part of the material exhibits a flow length/thickness ratio of 550.

The inject and squash method is the subject of UK patent application 9927710.5 of Coraltech Limited, and relies on providing the pressure to inject the material primarily from movement of a part of the mould. It is analogous to forging of metal, and consists in the steps of:

providing a mould having one part which is movable with respect to another part to close the mould part gap therebetween;

closing the mould to define an injection mould part gap such that injection into it fills only a minor part of the mould cavity to thickness greater than that of the finish formed article;

injecting plastics material into the mould part gap to fill only the minor part to the greater thickness; and closing the mould to the final mould part gap, thereby driving the plastics material to fill the rest of the mould cavity and provide the article with its finish formed thickness.

The mould can have an additional part such as a movable core face or cavity bottom for providing the closure to the final mould part gap. Alternatively, it can be a conventionally configured two part mould which is not fully closed for the injection step.

In the case of the additional mould part, the two principal parts of the mould are fully closed by the injection moulding machine for the injection step and final closure is provided by additional actuator(s).

In the case of the conventionally configured mould, the mould machine is held slightly open at the injection step and fully closed for the final closure. An injection moulding machine with an over-centre toggle closure mechanism is well adapted to provide the substantial force require to effect he final closure.

Since the pressure in the plastics material on final closure is substantial, the injection gate is preferably closed—as by a valve—prior to final mould closure. This is to avoid expulsion of material from the tool during final closure.

Preferably the final closure involves reduction of the mould part gap over a substantial portion of the surface area of the finish formed article, whereby movement of the plastics material through a thin mould part—which might otherwise be regarded as too thin—occurs only during the last part of the final closure.

The moulding material may have added to it carbon fibres of nominal length for example about 5 mm before moulding. During the mixing and injection of the moulding material the fibres may be broken to lengths as short as perhaps 0.5 mm. The fibres make up 25% to 50% of the moulding material by weight. When the material is compressed and caused to distribute itself through the mould, the fibres tend to align themselves in the direction of flow and thus adopt a preferred orientation. When fibre reinforced, the material may have a Youngs Modulus of up to 5000 or 6000 MPa or more. loudspeaker cones. Thinner sections can be utilised in the finished cone to achieve a given stiffness. Thus it is possible to achieve a polypropylene moulded cone as light as but significantly stiffer than a paper one. The inclusion of ribs as described also brings advantages, even if the moulded material is no stiffer than a paper cone of comparable weight. Cones according to the invention can have some or all of the following advantages:

Lower acoustic distortion—Polypropylene has inherently better damping, thus reducing the severity of a distortion mode. The stiffness of the cone combined with the additional stiffness provided by the ribs moves distortion modes to higher frequencies. At these higher frequencies the cone displacement is significantly less because displacement varies with $1/f^2$. Since distortion arises from non-linear deformation in the shape of the cone, distortion too is reduced at higher frequencies. The ribs can be positioned, using finite element analysis techniques, to target a particular problem mode. Axisymmetric ribs stiffen out bell modes and radial ribs at particular positions can combat axisymmetric modes.

Greater high frequency extension—Traditionally the high frequency extension of a cone is determined by the depth of the cone and the radius of curvature (24, FIG. 3) that makes the cone profile. Typically the frequency range of a conventional cone is provided by five or six modes of vibration of the cone. Above this range the high frequency response decreases. The useful modes occur higher in the frequency range when the cone is deeper and its profile is straighter, due to geometrical stiffening of the structure. This gives rise to obvious restrictions in frequency response when the designer is restricted to a shallow package depth, eg. for a loudspeaker to be fitted in a vehicle door. The high frequency extension of the cones here described is less constrained by the depth of the cone. The geometrical stiffness can be tuned by the ribs, achieving the stiffness of a deep cone but in a shallow package.

Tunable frequency response curve (on and off axis)—The precise positioning of the ribs can help achieve a specific transfer function. Off-axis there is in theory a trade-off between the frequency response and the high frequency extension achieved by stiffening the cone. For example a completely rigid piston will begin to "beam" above frequencies where the wavelength is equal to the piston diameter. In reality as the cone breaks up, the off axis response tends to be better than the theoretical limitation of a rigid piston. Using the ribs it may be possible to have improved high-frequency extension without sacrificing off axis response. This would require investigation using finite element analysis, suitable programs for which are commercially available.

High sensitivity/light weight motor unit—Since it is possible to produce a cone in such a relatively stiff material, the moving mass cm be kept to a minimum. The sensitivity of a loudspeaker is inversely proportional to the mass and consequential reasonable levels of sensitivity can be achieved without resorting to large and heavy magnet assemblies. The result is that the weight of the complete loudspeakers can be significantly reduced to eg. 150 g for a 120 mm diameter loudspeaker. This is an advantage for weight-sensitive applications such as vehicle audio systems.

Less severe bell modes—The circumferential ribs reduce the severity of bell modes. These modes tend not to manifest themselves in the frequency response but often combine with low order cone modes resulting in an unacceptable level of distortion.

Smoother frequency response—Two mechanisms smooth the frequency response. Polypropylene tends to be better damped than paper thus smoothing the peaks and troughs, and the ribs can be strategically applied to shift offending modes that lead to significant dips in response.

Waterproof—The cone material is resistant to water without any requirement for treatment. This means when the loudspeaker is used in a vehicle door, the rain shield can be omitted, saving both cost and weight.

Pest resistant—In parts of the world, paper cones are subject to insect attack. A cone as here particularly described is not.

Each feature disclosed in this specification (which term includes the claims) and/or shown in the drawings may be incorporated in the invention independently of other disclosed and/or illustrated features.

Statements in this specification of the "objects of the invention" relate to preferred embodiments of the invention, but not necessarily to all embodiments of the invention falling within the claims.

What is claimed is:

1. A method of manufacturing a loudspeaker diaphragm comprising moulding it from a flowable plastics material such that part of the material flows within the mould during moulding a distance equal to at least 300 times the thickness of that part of material after moulding, the moulded material having a Youngs Modulus of at least 1500 MPa.

2. A method as clamed in claim 1 wherein said part of the material is caused to flow said distance.

3. A diaphragm or method as claimed in claim 1 wherein the flow is generally radially of the diaphragm.

4. A loudspeaker diaphragm moulded from flowable plastics material having a Youngs Modulus of at least 1500 MPa, a part of the cone having a flow length/thickness ratio (as herein defined) of at least 300.

5. A diaphragm as claimed in claim 4 wherein the material contains reinforcing fibres.

6. A diaphragm as claimed in claim 5 wherein the reinforcing fibres comprise one or more of carbon fibres, glass fibres, polyester fibres, vegetable fibres or annual fibres.

7. A diaphragm as claimed in claim 6 wherein the fibres are carbon fibres and constitute from 25% to 50% by weight of the material.

8. A diaphragm as claimed in claim 5 wherein the longitudinal extends of the fibres exhibit a preferred orientation radially from a central region of the diaphragm.

9. A diaphragm as claimed in claim 4 wherein different regions of the diaphragm have different thicknesses, whereby to modify the acoustic properties of the diaphragm.

10. A diaphragm as claimed in claim 9 wherein at least one said region comprises an elongate rib.

11. A diaphragm as claimed in claim 4 wherein the thickness of the said part does not exceed 0.20 mm.

12. A loudspeaker comprising a diaphragm as claimed in claim 4.

* * * * *

UNITED STATES PATENT AND TRADEMARK OFFICE
CERTIFICATE OF CORRECTION

| | | |
|---|---|---|
| PATENT NO. | : 6,640,925 B2 | Page 1 of 1 |
| APPLICATION NO. | : 10/059631 | |
| DATED | : November 4, 2003 | |
| INVENTOR(S) | : Pocock et al. | |

It is certified that error appears in the above-identified patent and that said Letters Patent is hereby corrected as shown below:

Column 2, under FOREIGN PATENT DOCUMENTS, the following should be added:

U.K.          0102280.5          1/29/2001

Signed and Sealed this

Twenty-fourth Day of October, 2006

JON W. DUDAS
*Director of the United States Patent and Trademark Office*